United States Patent [19]
Cruse et al.

[11] Patent Number: 6,073,552
[45] Date of Patent: Jun. 13, 2000

[54] METHOD OF FASTENER IDENTIFICATION BY IMPRESSING CHARACTERS INTO A SURFACE

[75] Inventors: Bridget Ann Cruse, Copley; David Allen Zdanowicz, Northfield, both of Ohio

[73] Assignee: SPS Technologies, Jenkintown, Pa.

[21] Appl. No.: 09/039,847

[22] Filed: Mar. 16, 1998

[51] Int. Cl.[7] .................................................. B44B 5/00
[52] U.S. Cl. .............................. 101/32; 101/5; 29/401.1; 411/378; 411/923; 470/8
[58] Field of Search .............................. 101/4, 5, 22, 29, 101/32; 29/401.1; 411/378, 923; 470/8, 9, 11

[56] References Cited

U.S. PATENT DOCUMENTS

| | | | |
|---|---|---|---|
| 2,661,681 | 12/1953 | Fenstermaker | 101/4 |
| 2,891,468 | 6/1959 | Taylor et al. | 101/5 |
| 4,275,652 | 6/1981 | Bo | 101/4 |
| 4,712,473 | 12/1987 | Amos | 101/4 |
| 5,031,488 | 7/1991 | Zumeta | 81/180.1 |
| 5,079,978 | 1/1992 | Kupfer | 81/119 |
| 5,284,087 | 2/1994 | Vaarala | 101/4 |
| 5,375,955 | 12/1994 | Leslie | 411/378 |
| 5,456,168 | 10/1995 | Lewis | 101/29 |
| 5,511,917 | 4/1996 | Dickson | 411/439 |

OTHER PUBLICATIONS

Fastening; Metric Blue® Product Group—Setting New Standards in Fastener Performance; Sep. 1997, pp. 12–14.
David Fowler, The Engineer; Getting a fix on fixings; Nov. 13, 1997.

*Primary Examiner*—Stephen R. Funk
*Assistant Examiner*—Leslie J. Grohusky
*Attorney, Agent, or Firm*—Hudak & Shunk Co., L.P.A.

[57] ABSTRACT

A method of fastener identification for traceability of manufacturing information of an individual fastener, is achieved by applying a code to the fastener. The fasteners to be identified typically are formed of hardened materials such as steel. A die cast, forged or pressed roll stamp or forge stamp is thus used to apply the code and is formed with a raised stencil of one or more characters or indicia. Multiple lots of a certain fastener typically are manufactured in a given time period, such as a year, thus requiring a different code to identify each fastener lot. Numbers of lots and sizes of individual lots for a given time period are difficult to predict for a fastener producer, thus risking waste if multiple customized stamps are used to identify the lots. A universal stamp having a single indicia stencil is utilized to identify all lots of a certain fastener in a given time period, by removing selected ones of the stencil characters from the universal stamp for each different lot.

6 Claims, 8 Drawing Sheets

LOT NUMBER FOR YEAR 1999

METHOD OF FASTENER IDENTIFICATION BY IMPRESSING CHARACTERS INTO A SURFACE

BACKGROUND OF THE INVENTION

1. Field of the Invention

The invention relates to fasteners and in particular to indicia applied to fasteners for tracing certain manufacturing information for individual fasteners. More particularly, the invention is directed to a method of applying such indicia to fasteners in an efficient manner while minimizing the purchase and inventory of tooling required for applying the indicia.

2. Background Art

In recent years, purchasers of fasteners increasingly have demanded that certain manufacturing information relating to a fastener be traceable using codes or the like. This demand has been driven primarily by product liability law, inasmuch as industries such as automotive and construction realize that such traceability will place them in a stronger position in a liability suit directed at one of their products, if it can be proven that all components in the product were made to proper specifications.

Heretofore, most fastener manufacturers have offered a tracing system in which codes typically are applied to a container such as a box or bin holding many fasteners. More particularly, a label attached to the fastener container typically displays information such as a laboratory and/or order number from which certain information about the fasteners can be traced, such as material, performance and manufacturing data. Such data can include date of manufacture, the material used in manufacture, lot certification, and heat treatment and statistical process control data. This information typically is maintained by the fastener manufacturer for at least five (5) years, in accordance with product liability law requirements.

However, such a label-driven tracing system is particularly cumbersome for a purchaser of the fasteners. This is because once an individual fastener is removed from its container for use such as in a product, the fastener user must record and maintain the container label information if it ever hopes to trace the origin of the fastener should a product failure or question about the fastener itself occur. Many industries thus now are demanding that responsibility for fastener tracing code recording/maintenance be transferred to the fastener manufacturer. In response to this demand, many fastener manufacturers have begun to apply tracing indicia directly to the fastener in the form of, for example, a three-digit code stamped into the head or shank of the fastener. Such a direct marking system facilitates traceability without burdensome information recording/maintenance by a product manufacturer for each fastener used. Direct marking also improves manufacturing processes for fastener manufacturers since it can eliminate costly and time consuming packaging of fasteners in boxes or the like which heretofore had to be labeled for traceability.

However, a problem also exists with direct marking of fasteners. More particularly, a plurality of code characters such as numbers and/or letters typically must be applied to a fastener to provide enough information for tracing. Since most industrial-grade fasteners are made of a hard material such as steel, special tools must be used to impress the indicia into the finished fastener. The conventional tools typically used to directly mark a fastener in such a manner are either a forge stamp for impressing indicia into a flat fastener surface, or a roll stamp for impressing the indicia into a curved fastener surface such as the shank of a bolt or the side of a head of a bolt. Unfortunately, forge stamps and roll stamps must be custom made either in a die, by forging or by pressing, and thus can be relatively expensive, and wear out fairly quickly due to their use on hard fastener surfaces. Therefore, it can be understood that a plurality of forge or roll stamps may be needed to mark a single manufacturing run or lot of fasteners. Moreover, most fastener producers manufacture many lots of a certain fastener during any given time period, usually a year, and since each lot must obviously be identified differently for tracing purposes, it can be appreciated that many stamping tools bearing different indicia must be purchased prior to fastener manufacture and held in inventory. Also, since it is difficult to predict how many fastener lots will be made in a given year or how large the lots will be, many stamping tools often are wasted since it is possible that a lot may be smaller than the number of identical stamping tools ordered for that lot, or that in a given year less lots will be manufactured than different stamping tools ordered for those lots.

The method of the present invention solves the above-described possible problem of excess purchase and inventory of costly fastener identification tooling, by selectively removing one or more of a plurality of code characters from a marking tool, and thereby making that tool universal for use with multiple lots in any given time period.

SUMMARY OF INVENTION

Objectives of the present invention include providing a method of fastener identification which eliminates the need for purchase and inventory of different marking tools for different fastener lots.

These objectives and advantages are obtained by the method of fastener identification of the present invention, the general nature of which may be stated as including the steps of, impressing at least one code character into a selected surface of each one of a plurality of fasteners using a tool formed with a pattern of at least one code character, for identifying a first manufacturing run of the fasteners, and selectively removing at least one of the pattern code characters from the tool for identifying a subsequent manufacturing run of the fastener.

BRIEF DESCRIPTION OF THE DRAWINGS

The preferred embodiment of the invention, illustrative of the best mode in which applicants have contemplated applying the principles, is set forth in the following description and is shown in the drawings and is particularly and distinctly pointed out and set forth in the appended claims.

Similar numerals refer to similar parts throughout the drawings.

DESCRIPTION OF THE PREFERRED EMBODIMENT

Figure 1:
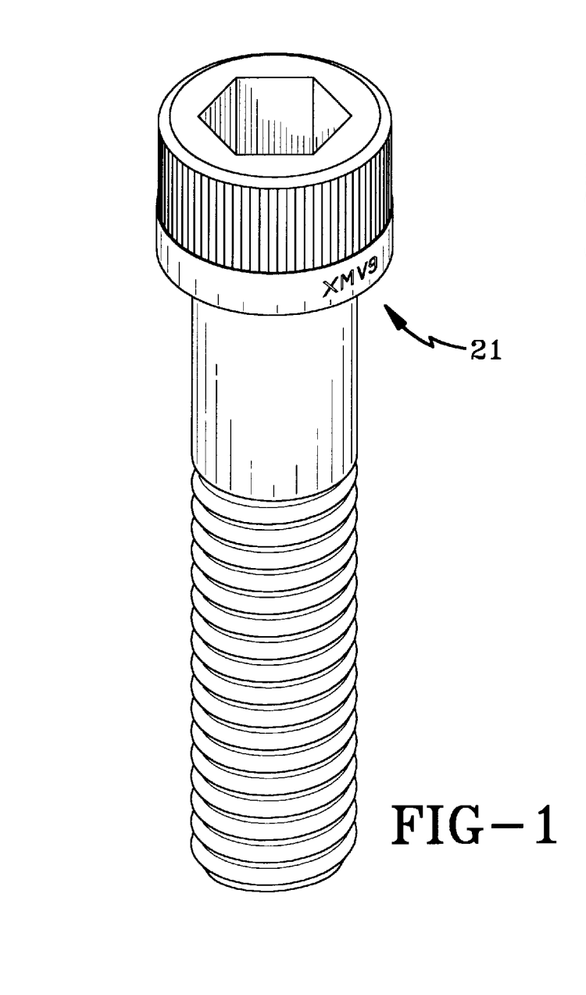
FIG. 1 is a perspective view of a socket head cap bolt having tracing indicia roll stamped into the side of the cap.
Figure 2:
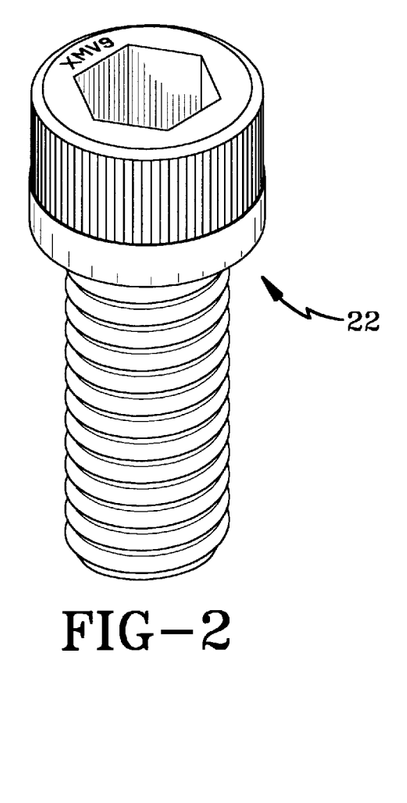
FIG. 2 is a perspective view of another socket head cap bolt, having tracing indicia forge stamped into the top surface of the cap.
Figure 3:
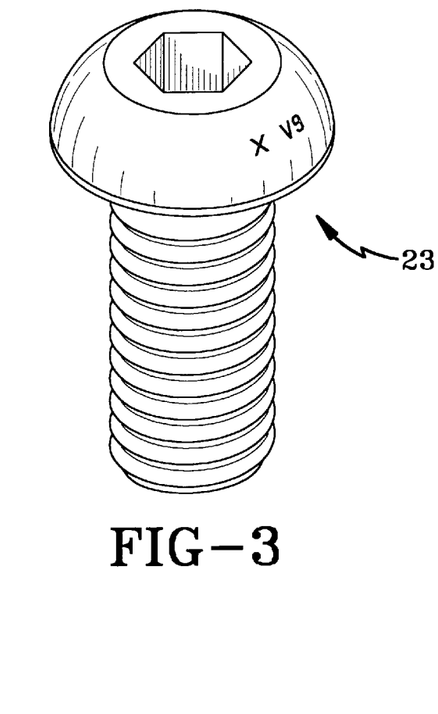
FIG. 3 is a perspective view of a button head bolt, having tracing indicia roll stamped into the button head.

Examples of types of fasteners that are markable with a tracing code by the method of the present invention are shown in FIGS. 1, 2 and 3, and are indicated generally at 21, 22 and 23, respectively. Fasteners 21 and 22 each are socket head cap bolts and fastener 23 is a button head bolt.

Figure 4:
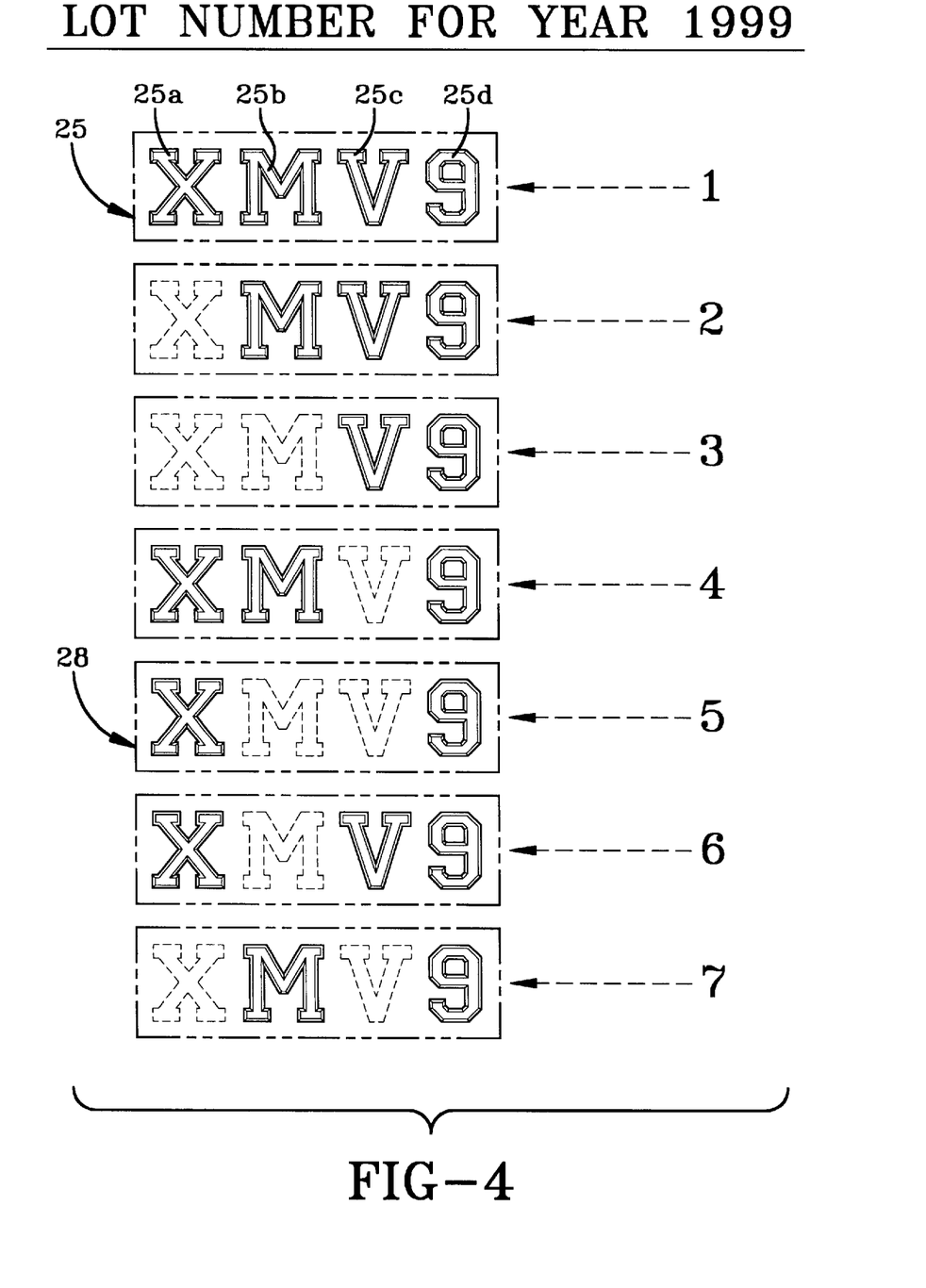
FIG. 4 is a legend showing one example of the type of indicia which can be utilized on a marking tool, and further showing the available permutations from those indicia for identifying different manufacturing lots using the same tool.

In order to achieve the most efficient and least burdensome traceability of manufacturing information such as material, performance and manufacturing data, including date of manufacture, lot certification, material and heat treatment data, and statistical process control data, a code can be applied directly to each fastener 21, 22, 23 to enable tracing from the fastener back to such data. Typically, however, more than one code character must be utilized to gain maximum traceability. One example of such coding indicia is represented in FIG. 4 and indicated at 25. Indicia 25 includes individual code characters 25a–d.

As illustrated in FIG. 4, it can be appreciated that when a manufacturing run or lot, such as lot number 1 for year 1999, is completed, then a different code or indicia must be applied to each of the succeeding lot numbers 2 through 7 in that year, so that seven different indicia are required. In applying such different indicia to different lots, the prior art would utilized seven different marking tools. Since marking tools typically wear out before an entire lot is produced, a plurality of marking tools having identical indicia would have to be maintained in inventory for each lot. Also, because it can be difficult for fastener manufacturers to predict the number of lots that will be produced in a given period of time and the size of each lot, it is possible that upon completion of a lot a large number of marking tools customized for that lot and held in inventory could become useless. Repeating this scenario for multiple lots or for lots that are never produced can be costly for the fastener producer.

Figure 5:
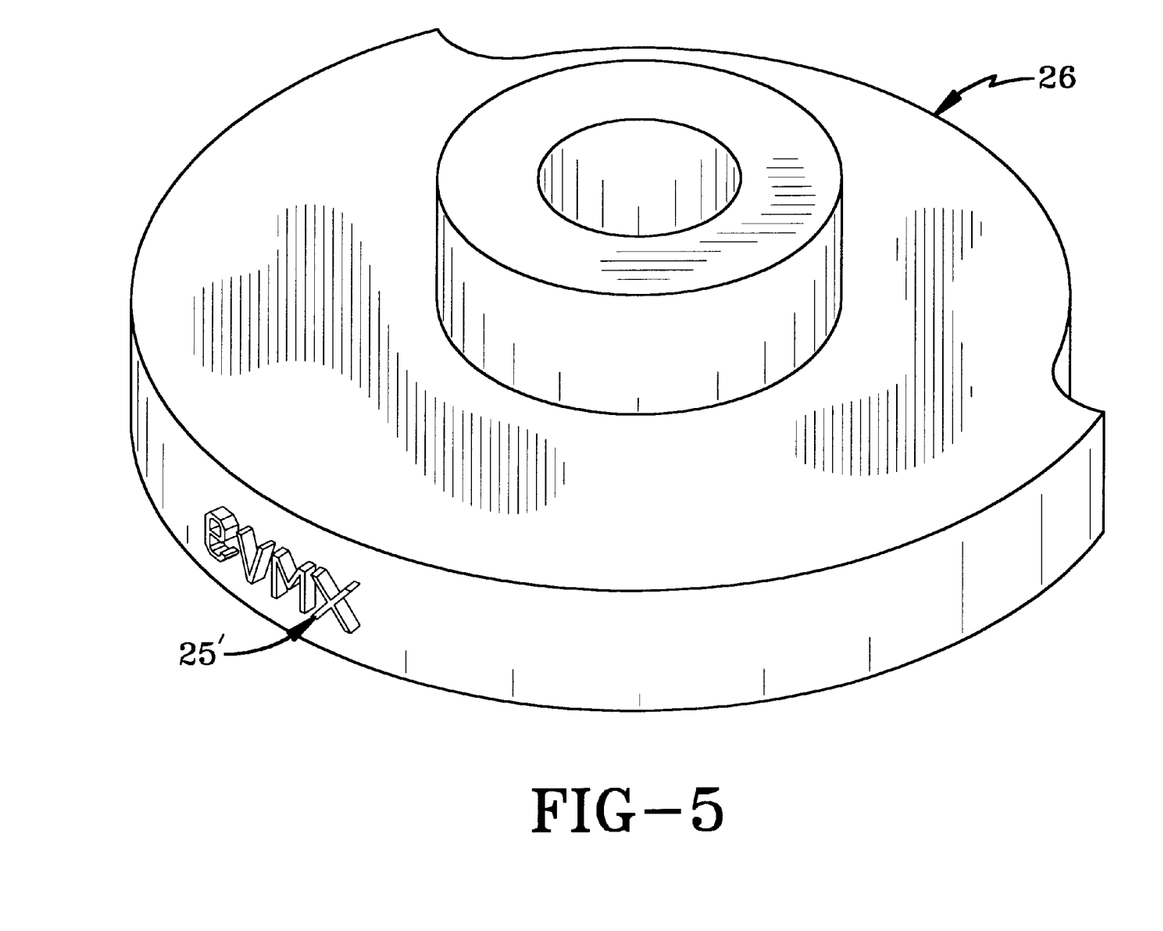
FIG. 5 is a perspective view of a roll stamp, showing the marking indicia of FIG. 4 as raised pattern on the stamping surface of the tool.
Figure 6:
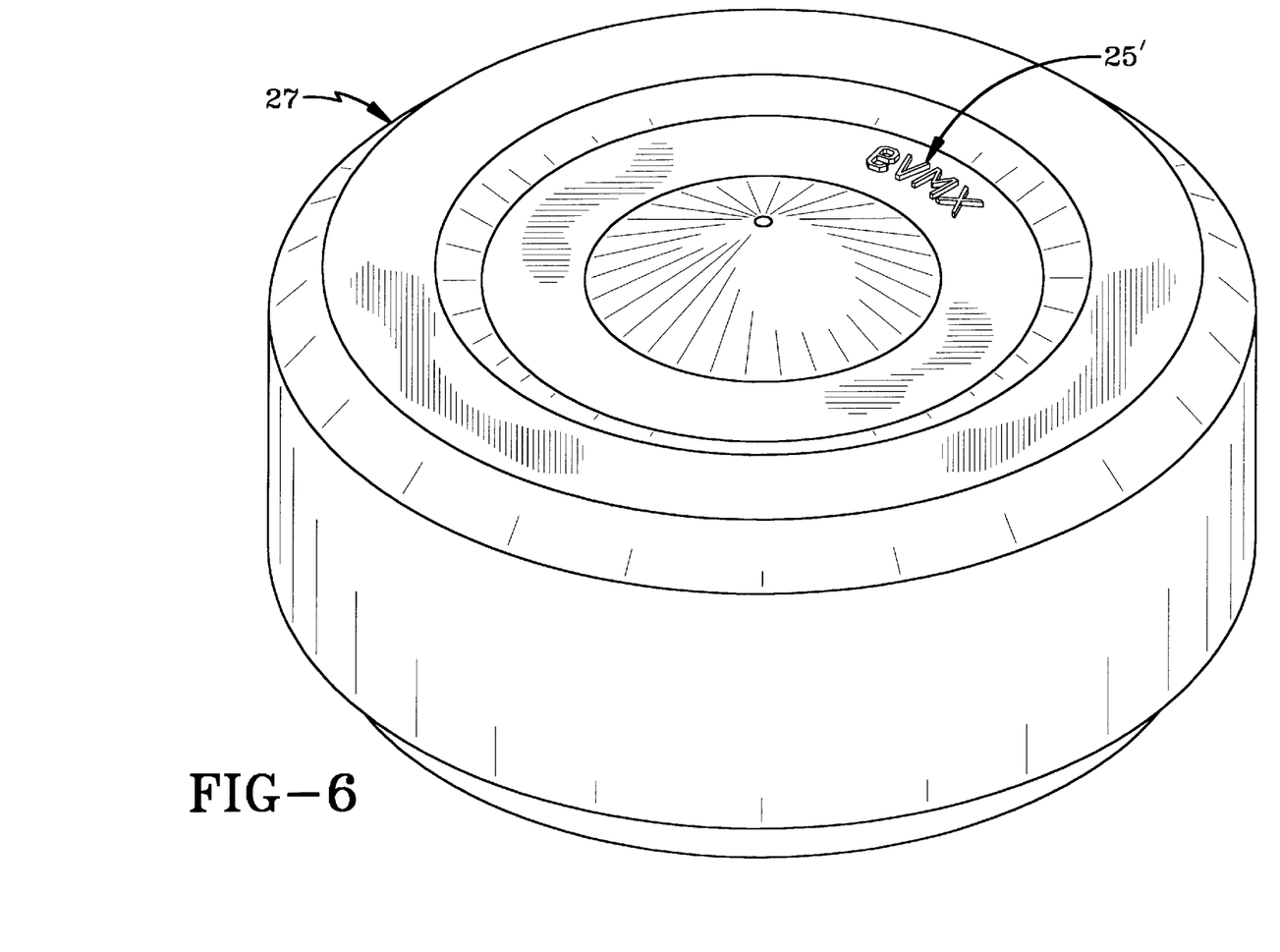
FIG. 6 is a perspective view of a forge stamp, showing the marking indicia of FIG. 4 as raised pattern on the stamping surface of the tool.

Indicia 25 can be applied to fasteners 21,22,23 by any suitable means, but since most fasteners are subjected to harsh product manufacturing and/or use environments, marking the indicia on the surface of the fastener such as by ink jet printing or the like is inadequate because such markings likely would easily wear off. Rather, a permanent impression of indicia 25 into the surface of each fastener 21, 22, 23 is preferred. Since fasteners 21, 22, 23 are formed of hardened steel or other like material, a roll stamp 26 or a forge stamp 27 (FIGS. 5–6) are required to penetrate the hard fastener surface. More specifically, stamps 26, 27 are typically either die cast, forged or pressed to create raised indicia stencil 25' on the marking surface of the stamp.

Figure 7:
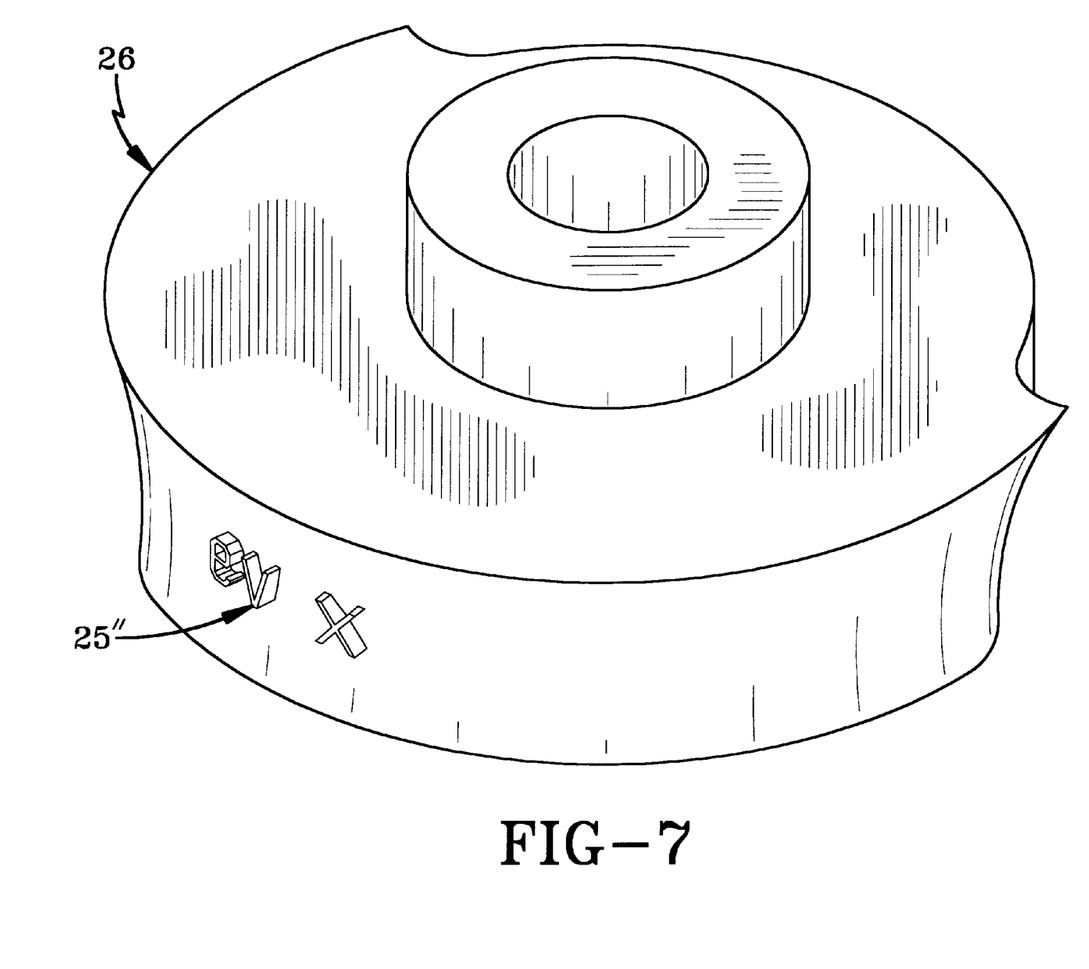
FIG. 7 is a perspective view of the roll stamp shown in FIG. 5, but having one of the stencil characters deburred from the stamping surface.
Figure 8:
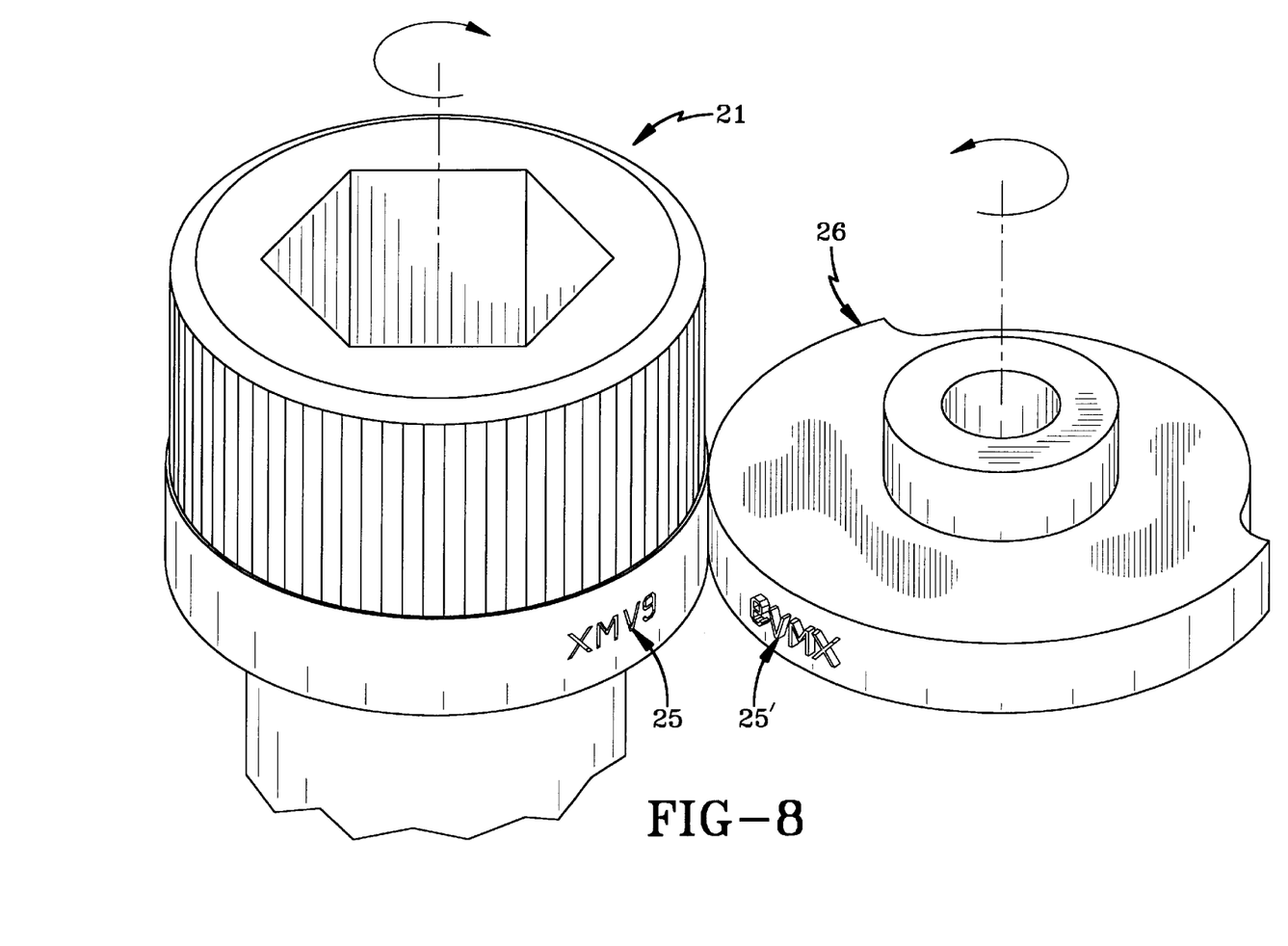
FIG. 8 is a perspective view showing the manner in which the roll stamp of FIG. 5 applies the indicia to the socket head cap bolt of FIG. 1.
Figure 9:
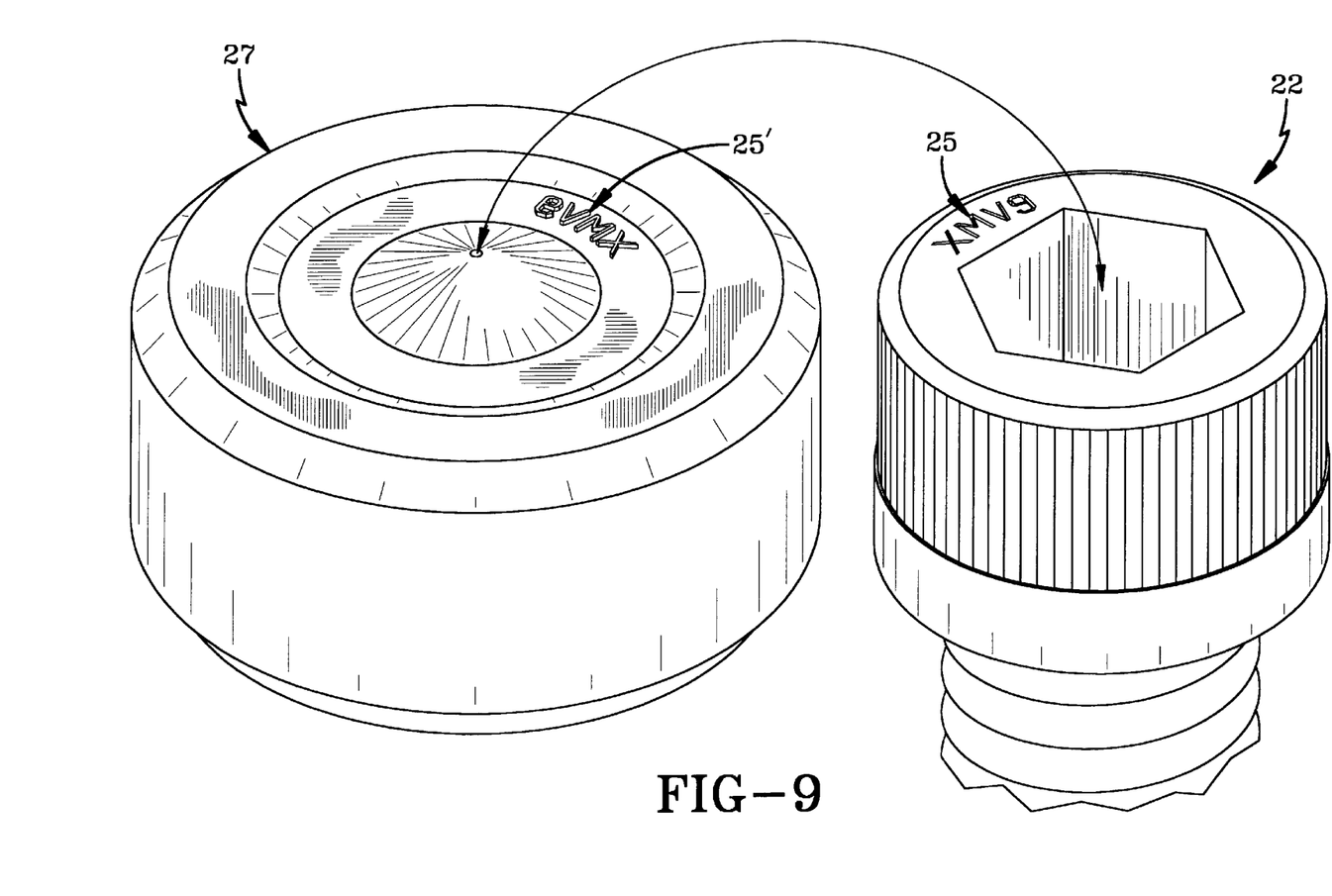
FIG. 9 is a perspective view showing the manner in which the forge stamp of FIG. 6 applies the indicia to the socket head cap bolt of FIG. 2.
Figure 10:
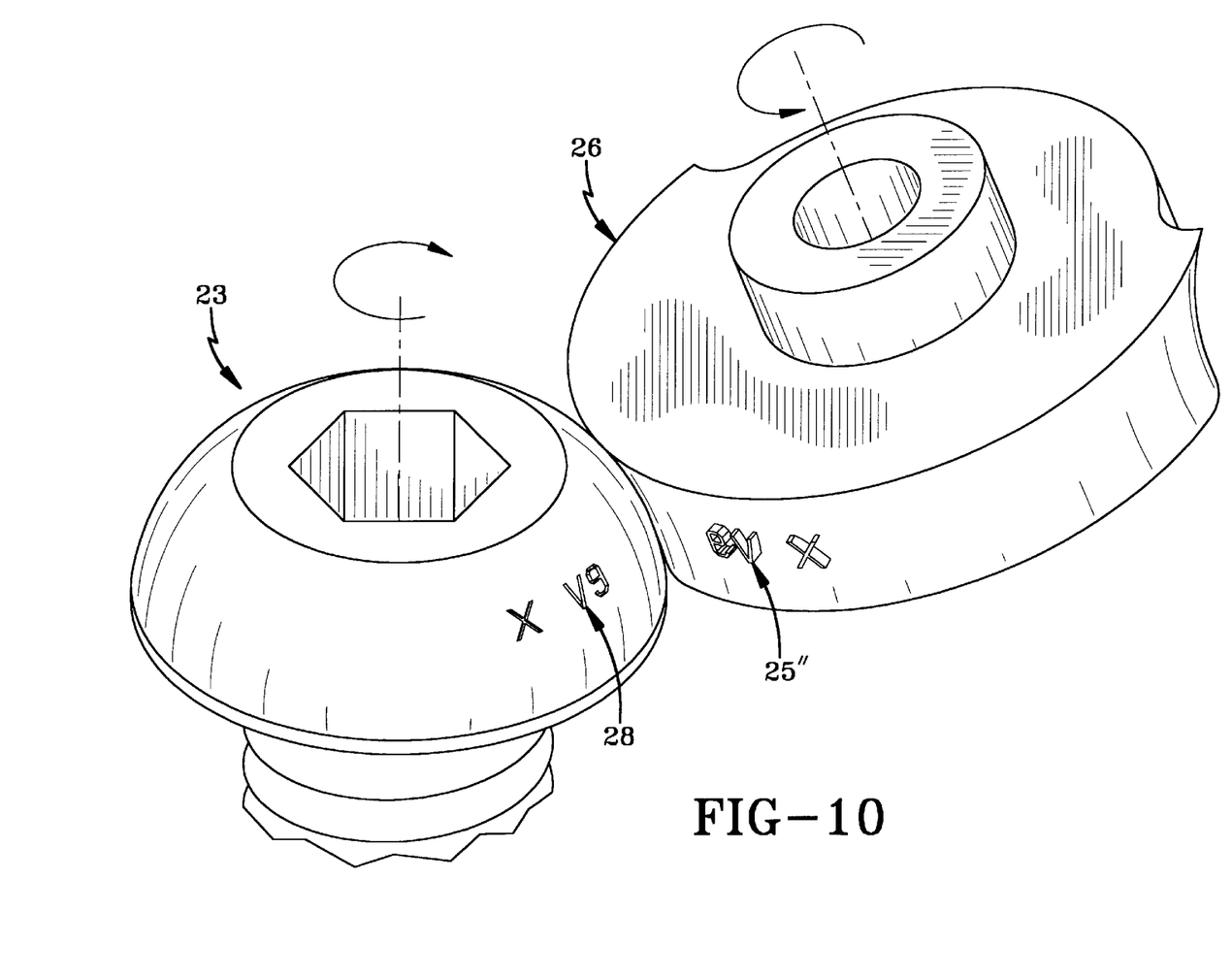
FIG. 10 is a perspective view showing the manner in which the deburred roll stamp of FIG. 7 applies the indicia to the button head bolt of FIG. 3.

In accordance with an important feature of the method of the present invention, the above-described problems associated with marking fasteners 21, 22, 23 with different combinations of indicia characters 25a–d (FIG. 4) to identify different lots of a certain one of the fasteners, is overcome. More particularly, roll stamp 26 and forge stamp 27 shown in FIGS. 5 and 6, respectively, can be used to impress selected ones of indicia characters 25a–d on any of lot numbers 1–7. More particularly, and as represented in FIG. 4 by broken lines, by practicing the method step of the present invention of removing one or more of indicia characters 25a–d from stamps 26, 27, only a single stamp need be ordered from the stamp producer and maintained in inventory because it is universal to all lots. As shown in FIGS. 8 and 9, roll stamp 26 and forge stamp 27 can be used to impress pattern 25' on lot number 1 of year 1999 for fasteners 21 and 22, respectively. However, when lot number 1 is completed, stamps 26, 27 still have utility for marking lot numbers 2 through 7 simply by deburring selected ones of characters 25a–d as represented by broken lines in FIG. 4. For example, when it is time to identify fastener lot number 6 of year 1999, the original custom roll stamp 26 shown in FIG. 5 can be retrieved from inventory and character 25b can be removed or deburred from the stamp by any suitable means such as a grinding wheel. Resulting roll stamp 26' having a pattern 25" consisting only of characters 25a, c, and d, (FIG. 7) can be used to mark lot number 6 of button head bolt 23 with altered indicia 28, as best shown in FIG. 10.

Thus, it can be appreciated that the method of the present invention saves cost for the fastener manufacturer, since only one die, forging or press is required to make universal stamps 26, 27. Moreover, inventory for the fastener producer is simplified, since multiple custom stamps 26, 27 need not be ordered or kept on hand for marking different lots.

It is understood that any number of marking symbols can be used to provide traceability of fasteners, without affecting the concept of the method of the present invention for removing indicia characters from marking stamps to provide for universal use of the stamps in different lot numbers. It is also understood that any type of indicia may be used, including letters, numbers, symbols, logos or the like. It is further understood that the method of the present invention can be utilized to mark surfaces of materials other than steel, such as plastic, wood, or the like, as well as products other than fasteners, such as various items, apparatus, or machines. It is still further understood that the method of the present invention can be used to mark hard surfaces for purposes other than traceability.

Accordingly, the improved method of fastener identification is simplified, provides an effective, safe, inexpensive, and efficient method which achieves all the enumerated objectives, provides for eliminating difficulties encountered with prior identification methods, and solves problems and obtains new results in the art.

In the foregoing description, certain terms have been used for brevity, clearness and understanding; but no unnecessary limitations are to be implied therefrom beyond the requirements of the prior art, because such terms are used for descriptive purposes and are intended to be broadly construed.

Moreover, the description and illustration of the invention is by way of example, and the scope of the invention is not limited to the exact details shown or described.

Having now described the features, discoveries and principles of the invention, the manner in which the improved method of fastener identification is used, the characteristics of the method, and the advantageous, new and useful results obtained; the new and useful elements and combinations are set forth in the appended claims.

What is claimed is:

1. A method of fastener identification, including the steps of:
    (a) impressing a plurality of code characters into a selected surface of each one of a plurality of fasteners using a tool formed with a pattern of the plurality of code characters, for identifying a first manufacturing run of the fasteners; and
    b) selectively removing by grinding, at least one of said pattern code characters from said tool to form a new code for identifying a subsequent manufacturing run of said fasteners.

2. The method of fastener identification of claim 1, in which the tool is formed of a metal.

3. The method of fastener identification of claim 2, in which the tool is selected from the group consisting of a roll stamp for impressing at least one of said plurality of code characters into a curved surface of said fastener, and a forge stamp for impressing said at least one of said plurality of code characters into a flat surface of said fastener.

4. The method of fastener identification of claim 3, in which at least one of the plurality of code characters identifies a year of manufacture of said fasteners.

5. A method of identification, including the steps of:
    a) impressing a plurality of code characters into a surface of each one of a plurality of objects using a tool formed with a pattern of the code characters for identifying a first lot of the objects, said tool being formed of a material having a hardness capable of making an impression on the surface of said objects; and
    b) selectively removing at least one of said pattern code characters from said tool by deburring to form a new code for identifying a subsequent lot of said objects.

6. The method of identification of claim 5, in which the tool is selected from the group consisting of a roll stamp for impressing at least one of said plurality of code characters into a curved hard surface of the object, and a forge stamp for impressing said at least one of said plurality of code characters into a flat surface of said object.

* * * * *